Nov. 14, 1933. W. H. NICKERSON 1,935,058
FILM FEEDING MECHANISM FOR MOTION PICTURE PROJECTORS
Filed Sept. 27, 1930
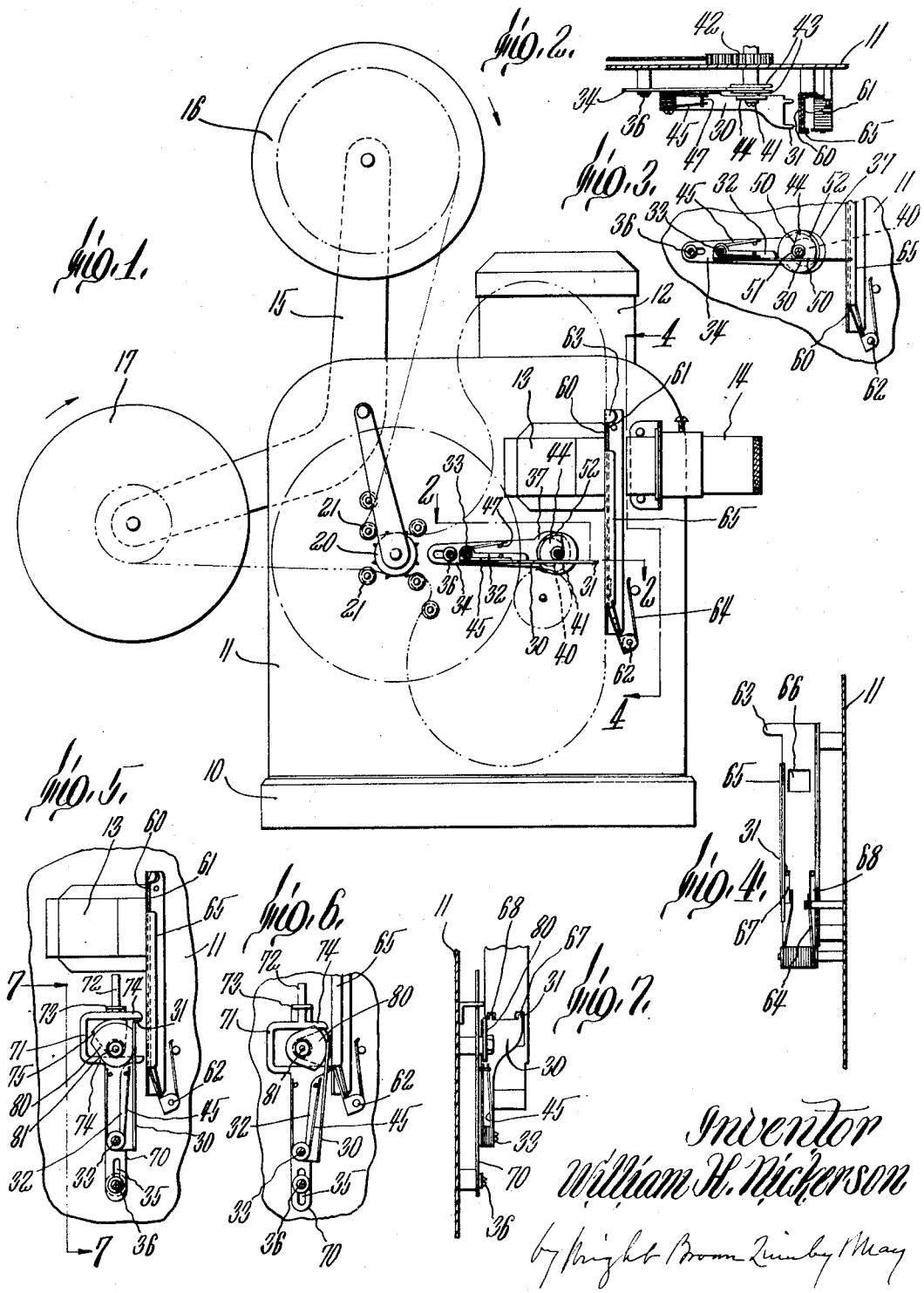
Inventor
William H. Nickerson
by Wright, Brown, Quinby & May
Attys Patented Nov. 14, 1933

1,935,058

UNITED STATES PATENT OFFICE 1,935,058

FILM-FEEDING MECHANISM FOR MOTION-PICTURE PROJECTORS

William H. Nickerson, Newton, Mass.

Application September 27, 1930
Serial No. 484,791

5 Claims. (Cl. 88—18.4)

This invention relates to mechanism for feeding a motion picture film in a projector. The mechanism is characterized by simplicity, efficiency of action, comparative silence when in operation, and economy of manufacture.

For a more complete understanding of the invention, reference may be had to the disclosure thereof in the following description and on the drawing, of which,—

Figure 1 is an outline elevation of a motion picture projector having a film feeding mechanism thereon embodying the invention.

Figure 2 is a fragmentary section on the line 2—2 of Figure 1.

Figure 3 is an elevation of the film feeding mechanism shown in Figure 1, the parts being illustrated in a different position of operation.

Figure 4 is a section on the line 4—4 of Figure 1.

Figure 5 is an elevation of a modified form of the invention.

Figure 6 is a similar elevation of the same, showing the parts in a different position of operation.

Figure 7 is a section on the line 7—7 of Figure 5.

Referring to the drawing in detail, Figure 1 illustrates in outline a conventional form of moving picture projector, including a base 10, a vertical wall 11, and a housing for an electric lamp, the upper portion of the housing being illustrated at 12. Light from the lamp in the housing 12 passes through an aperture in the wall 11 and is reflected by a mirror or prism 13 to project through a tube 14 within which are the usual lenses. The projecting mechanism also includes a bracket 15 which is provided with supports for a supply spool 16 and a take-up spool 17. The take-up spool may be driven by any suitable mechanism in a manner well known in the art. Mounted on the wall 11 is a spiked feed wheel 20 for drawing film from the supply spool 16 and for feeding it at a similar speed to the take-up spool 17 so that adequate loops of slack film are provided for the intermittent feeding mechanism. Suitable guide wheels 21 are provided adjacent to the feed wheel 20 to ensure engagement of the film with this feed wheel. The structure thus far described is well known in the art and is common to most motion picture projectors.

The invention is embodied in mechanism for intermittently feeding the film past a beam of light projecting from the reflector 13 through the tube 14. In order to produce the proper effect on the screen, the film must be fed with a step-by-step motion so that for a certain brief interval of time it is held stationary in the path of the light beam. After this interval of exposure a shutter (not shown) cuts off the beam of light momentarily and the film is shifted from one picture thereon to the next successive picture during this short interval of darkness. This shifting of the film must take place rapidly as the film must be stationary when the shutter passes from the path of the light beam. This intermittent feeding motion is effectively accomplished by the mechanism illustrated on the drawing.

Referring to Figures 1 to 4, this mechanism may comprise a feeding arm 30 at the end of which are a pair of prongs 31 adapted to enter marginal holes through the strips of film. The arm 30 is provided with a flange 32 along a portion of one edge thereof and is pivotally mounted as at 33 on a pitman 34. This pitman has a longitudinal slot near one end thereof in which rides a guide pin 36. The opposite end of the pitman is an eccentric strap 37 which surrounds an eccentric 40 mounted on a shaft 41 which is driven through a suitable gear train 42 by the driving mechanism (not shown) by which the feed wheel 20 and the take-up reel 17 are driven. As shown in Figure 2, the eccentric 40 and eccentric strap 37 are mounted between a pair of collars 43 which keep them properly registered with each other. Mounted on the shaft 41 with the eccentric 40 is an edge cam 44 which bears on the feed arm 30 so as to rock this arm on its pivot 33. As is evident from the drawing, the rocking motion imparted to the arm by the cam 44 results in the feeding motion of the prongs 31. The arm is constantly held against the edge of the cam 44 by a suitable spring 45 which, as shown, may press against a pair of pins 46 and 47 mounted respectively on the flange 32 of the arm and the pitman 34. The eccentric imparts an in and out movement to the prongs 31 by reciprocating the pitman 34 and thereby reciprocating longitudinally the feed arm 30 which is mounted on the pitman. The motion of the pitman also assists to some extent the feeding motion of the arm since there is a lateral or vertical component to the reciprocation of the pitman.

The cam 44 is preferably sector-shaped, as shown, its contour consisting of a pair of straight converging side edges 50 connected by an arc 51 with a small radius of curvature and connected at their other ends by an arc 52 with a greater radius of curvature. Both these arcs are concentric with the axis of rotation of the cam so that when the arm 30 is tangent to either arcuate portion of the cam contour, there is no rocking movement thereof. When the point of contact between the cam and the arm shifts from one of the straight edges 50 to the larger arc 52, or from this arc to the other of the straight edges 50, a rapid rocking movement of the arm takes place, this movement in one direction resulting in a feeding stroke to advance the film a definite distance, and in the other direction to restore the prongs to position for the next succeeding stroke. The in and out movements are related to the feeding and return movements as follows: The motion of the eccentric inserts the prongs into a pair of apertures in the film, then the cam 44 acts to rock the feeding arm 30 to advance the film the desired distance while the prongs are engaged in marginal apertures in the film. The prongs are then retracted from these apertures by the action of the eccentric, whereupon the cam 44 allows the arm 30 to swing upward under the influence of the spring 45 so as to position the prongs opposite another pair of apertures for feeding the film.

In Figure 1 the apparatus is shown with the prongs in their upper position ready to be advanced into a pair of apertures in the film. Figure 3 shows the prongs projecting through the film and ready for feeding movement by the downward swing of the arm 30 in contact with the cam 44. It may be noted that the most rapid portions of the feeding movement of the prongs is the first part, the movement slowing up as the arm 30 swings to its lowermost position. This feature of the cam action prevents an overthrow on the part of the arm 30 which would carry the prongs too far down against the restraining action of the spring 45.

The portion of the film which is projected on the screen is held in flat position by a pair of guide plates 60 and 61. The former may be in a fixed position, the latter being hinged as at 62 so as to be easily swung out as by a finger tab 63 to facilitate the threading of the film between two plates. A spring 64 may be provided to press the plate 61 resiliently against the plate 60 and thus to hold the film flat without excessive friction. Along a portion of the side edges of the plate 60 a pair of guide flanges 65 may be provided to guide the film properly alined between the plates. The plates 60 and 61 each have a rectangular aperture 66 therethrough, these apertures registering with each other in line with the axis of the tube 14 so as to permit the rays of light from the lamp to pass through the portion of the film in the opening and through the lenses in the tube 14 to the screen. The plates 60 and 61 are also provided with pairs of slots 67 and 68 through which the prongs 31 may project for feeding the film.

A modified embodiment of the invention is illustrated in Figures 5, 6 and 7. In this form, a pitman 70 is mounted in a substantially vertical position and is provided with a cam following portion 71 in place of the eccentric strap employed in the other form of the invention. An extension 72 on the pitman projects through a suitable guide 73 to prevent lateral motion of the pitman. Near the lower end of the pitman is a slot 35 in which rides a guide pin 36. Within the cam following portion of the pitman, which consists essentially of a pair of transverse parallel members 74 connected at one or both ends so as to preserve their position relative to each other, is a cam 75 shaped similarly to the cam 44, hereinbefore described. The cam 75 acts alternately on the parallel members 74 to impart quick intermittent movements to the pitman in opposite longitudinal directions. The feeding arm 30, with its prongs 31, is pivotally mounted on the pitman 70, as at 33, and is pressed resiliently against a cam 80 by a spring 45. The cams 75 and 80 are mounted on a common shaft 81 which may be driven by any suitable means, preferably geared to or otherwise synchronized with the driving means for the feeding wheel 20. As is evident from Figures 5 and 6, the cam 75 raises the pitman 70 and the arm 30 so that the prongs are elevated to be ready to engage the film for a feeding stroke. At this moment the cams are in the position illustrated in Figure 5. Further rotation of the shaft 81 in a clockwise direction causes the prongs 31 to advance through a pair of apertures in the film. While the prongs are thus held in engagement with the film, the pitman and arm are moved downwardly by the cam 75, imparting feeding movement to the prongs, after which the cam 80 permits the retraction of the prongs 31 from the film by the spring 45. Then the cam 75 raises the pitman and arm so as to return the prongs to the position shown in Figure 5. Figure 6 shows the mechanism in the middle of the feeding stroke of the prongs.

I claim:

1. In a motion picture projector or the like, means for feeding a vertical stretch of film, comprising a substantially horizontal pitman with an eccentric strap at one end thereof, an eccentric engaging within said strap and operable to rock and reciprocate said pitman, a substantially horizontal arm carried by and pivotally mounted on said pitman at a point remote from the film to be fed, said arm having a longitudinally extending prong adapted to enter a perforation in said film, and a sector-shaped cam engaging a face of said arm and rotatable to rock said arm and impart film-feeding motion to said prong.

2. Mechanism for feeding a vertical stretch of film in a motion picture apparatus, comprising a substantially horizontal pitman movable toward and from said film, an arm carried by and pivotally mounted on said pitman at a point remote from said film, said arm being movable with said pitman toward and from the film and being rockable laterally with respect to the pitman, means for reciprocating and rocking said pitman, a prong projecting longitudinally from an end of said arm and adapted to enter a perforation in said film, and means synchronized with said reciprocating means for rocking said arm laterally between reciprocating movements of said pitman.

3. Mechanism for feeding a vertical stretch of film in a motion picture apparatus, comprising a member laterally rockable and longitudinally reciprocable toward and from said film, a substantially horizontal arm carried by and pivotally mounted on said member at a point remote from said film and reciprocable therewith, a prong projecting from the end of the arm adjacent to the film, and means for rocking said arm for feeding movement of said prong after each reciprocating stroke toward the film and for rocking said arm in the reverse direction after each reciprocating stroke away from the film.

4. Mechanism for feeding a vertical stretch of film in a motion picture apparatus, comprising a substantially horizontal pitman, means for causing the end portion of said pitman adjacent to the stretch of film to move in a substantially circular path, an auxiliary arm carried by and pivotally mounted on said pitman at a point remote from said end portion of the pitman, said arm being approximately aligned with said pitman and having a free end adjacent to said end portion of the pitman, a cam engaged by said arm near its free end, and spring means acting between said pitman and arm to maintain the arm in contact with said cam.

5. Mechanism for feeding a vertical stretch of film in a motion picture apparatus, comprising a rotatable shaft, a member revoluble about the axis of said shaft by rotation thereof, a pitman with one end portion connected to said revoluble member, an auxiliary arm carried by and pivotally mounted on said pitman at a point remote from said end portion, a cam on said shaft, and means for resiliently maintaining a portion of said arm in engagement with said cam, said means including a spring carried by and acting between said arm and said pitman.

WILLIAM H. NICKERSON.